Patented Oct. 12, 1948

2,451,185

UNITED STATES PATENT OFFICE 2,451,185

FLUORINATED PRODUCTS AND PROCESS

Atherton M. Whaley, Columbia, S. C.

No Drawing. Application March 25, 1946,
Serial No. 657,071

5 Claims. (Cl. 260—348)

My invention relates to the fluorination of chemical compounds, and more particularly to a new process of fluorinating organic compounds which contain both halogen and oxygen, and the production thereby of new fluorinated compounds never produced heretofore.

The new compounds are useful, per se, in the chemical field and also will serve as intermediates or stepping stones in the synthesis of other valuable chemical compounds particularly those containing fluorine, such as fluorinated acids, aldehydes, alcohols and ketones, and their derivatives.

The process of my invention is technically different from those known heretofore and furthermore has the practical advantages of being carried out at atmospheric pressure and moderate temperatures in contrast to many prior fluorination processes that require high temperatures and pressures.

One of the features of my process is the preparation of organic compounds containing both fluorine and oxygen. Up to now it has proven relatively difficult to introduce fluorine into most organic compounds that contain oxygen. However, this is now easily and economically accomplished by my process in which a halogenated organic compound, containing an oxygen atom in a certain definite position with respect to the position of a halogen atom or atoms in this compound, is reacted with an inorganic fluoride compound. In this reaction the fluorine of the inorganic compound replaces specific halogen (chlorine, bromine, or iodine) atom or atoms in the organic compound.

While I do not wish to be limited to any theory or explanation of the ease of operation of my process, it appears that the halogen atom to be replaced is seemingly "activated" by the oxygen atom which is attached to a carbon atom common to both. When using this type of organic compound the fluorination may be effected easily with inexpensive inorganic fluorinating agents.

In accordance with my invention organic compounds represented by the following type formula may be used in the fluorinating reaction:

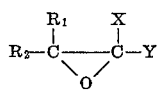

in which,

X is chlorine, bromine or iodine;
Y is fluorine, chlorine, bromine, iodine;
$R_1$ and $R_2$ are halogen, hydrocarbon group, oxygen, or hydrogen or any combination of these.

An important characteristic of each of the above types of organic compounds for use in my invention is the presence of one or more chlorine, or bromine, or iodine atoms attached to a carbon atom, which is attached in turn to an oxygen atom and another carbon atom also connected with the oxygen atom. The essential nucleus of these suitable compounds may be represented as follows:

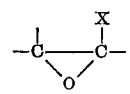

in which X is a chlorine or bromine or iodine atom.

Examples of compounds which possess the above essential nucleus are:

1. 1,1 - dichloro - 1, 2 - epoxy-2-methylpropane having the formula:

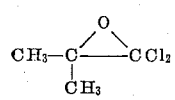

2. 1,1 - dichloroepoxyethane having the formula:

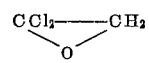

3. 2,2 - dichloro - 1,2 - epoxyethylethyl ether having the formula:

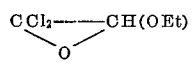

4. 2,2 - dibromo, 1,2 - epoxyethylethyl ether having the formula:

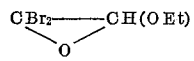

The chlorine, bromine, or iodine atom attached as in the above compounds is easily replaced by fluorine, when reacted with a suitable fluorinating compound. Illustrative but non-limiting examples of useful fluorinating compounds are the following:

Antimony trifluoride
Calcium fluoride
Mercury fluorides
Silver fluoride

When organic compounds of the type represented by the structural formulae given hereinabove are reacted with the fluorinating agents, such as illustrated by the examples just above, fluorinated organic compounds containing both fluorine and oxygen are produced and may be represented by the following general formula:

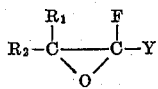

in which,

F is a fluorine atom;
Y is fluorine, chlorine, bromine, iodine;
$R_1$ and $R_2$ are halogen, hydrocarbon group, oxygen, or hydrogen or any combination of these.

If Y and/or Z is halogen as chlorine, bromine or iodine, then Y can also be replaced by fluorine and we would have:

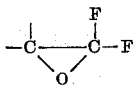

with $R_1$, $R_2$, and $C_2$ being as stated just above. Thus my process can produce a monofluoride or difluoride depending on how many halogen atoms are replaced by fluorine.

Several specific examples of final products produced according to my process are:

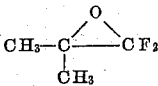

1,1-difluoro-1,2-epoxy-2-methylpropane

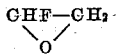

1-fluoroepoxyethane

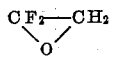

1,1-difluoroepoxyethane

To illustrate my process with a fluorinating agent such as antimony trifluoride: The organic halogen-oxygen compound is heated with powdered antimony trifluoride. The reaction proceeds rapidly and the fluorinated product is separated by distillation or mechanically, then washed, dried and fractionated.

*Example*

141 gms.

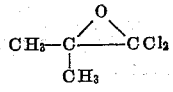

(1,1-dichloro-1,2 epoxy-2 methylpropane)

is heated with 130 gms. $SbF_3$ (antimony trifluoride). The reaction takes place quickly and the reaction product:

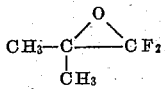

(1,1-difluoro-1,2-epoxy-2-methylpropane)

volatilizes out of the reaction zone and is led through a condenser into a receiver cooled with ice-salt mixture.

Various modifications and substitutions may be made in the above described materials, processes and products without departing from the scope of my invention, as indicated by the appended claims.

I claim:
1. The products of the general formula:

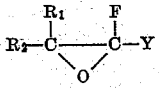

wherein, F is fluorine, Y stands for a member of the group consisting of fluorine, chlorine, bromine, iodine, $R_1$ and $R_2$ each stands for a member of the group consisting of halogen, hydrocarbon, oxygen, hydrogen and combinations thereof.

2. The product 1,1 - difluoro - 1,2 - epoxy - 2 - methylpropane, having the formula:

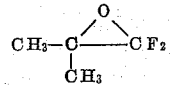

3. A method of producing fluorinated products that contain both fluorine and oxygen, comprising heating an organic compound of the general formula:

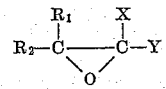

wherein, X stands for a member of the group consisting of chlorine, bromine, and iodine, Y stands for a member of the group consisting of fluorine, chlorine, bromine, iodine, $R_1$ and $R_2$ each stands for a member of the group consisting of halogen, hydrocarbon, oxygen, hydrogen; with an inorganic fluorine compound selected from the group consisting of antimony trifluoride, calcium fluoride, mercury fluorides and silver fluoride so that the fluorine thereof replaces part or all of the halogen in the said organic compound.

4. A method of producing fluorinated products that contain both fluorine and oxygen comprising reacting an organic compound having the nucleus:

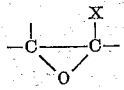

wherein, X is a member selected from the group consisting of chlorine, bromine and iodine, with an inorganic fluorine compound selected from the group consisting of antimony trifluoride, calcium fluoride, mercury fluorides and silver fluoride so that the fluorine thereof replaces the halogen in said organic compound.

5. A method of producing the compound 1,1-difluoro - 1,2-epoxy-2-methylpropane comprising reacting 1,1 - dichloro - 1,2 - epoxy-2-methylpropane, with antimony trifluoride.

ATHERTON M. WHALEY.

REFERENCES CITED

The following references are of record in the file of this patent:

UNITED STATES PATENTS

| Number | Name | Date |
|---|---|---|
| 2,086,077 | Groll | July 6, 1937 |
| 2,404,706 | Harmon | July 23, 1946 |
| 2,427,624 | Rushmer et al | Sept. 16, 1947 |

FOREIGN PATENTS

| Number | Country | Date |
|---|---|---|
| 363,099 | Great Britain | Dec. 17, 1931 |
| 477,843 | Great Britain | Jan. 3, 1938 |

OTHER REFERENCES

Booth and Burchfield: Journal American Chemical Society, 57, 2070 (1935).